United States Patent [19]
Rist

[11] 3,907,074
[45] Sept. 23, 1975

[54] MECHANICALLY OPERATED DISC-BRAKES

[75] Inventor: Michel Rist, Boulogne, France

[73] Assignee: Societe Anonyme Francaise du Ferodo, Paris, France

[22] Filed: July 30, 1973

[21] Appl. No.: 383,671

[30] Foreign Application Priority Data
Aug. 8, 1972 France .............................. 72.28536
July 18, 1973 France .............................. 73.26262

[52] U.S. Cl. .............. 188/72.9; 188/71.9; 188/73.5; 188/196 BA; 192/70.24
[51] Int. Cl.² ........................................ F16D 55/02
[58] Field of Search ....... 188/72.6, 72.9, 71.9, 73.3, 188/73.4, 73.5, 196 BA; 192/70.24

[56] References Cited
UNITED STATES PATENTS

| | | | |
|---|---|---|---|
| 2,953,221 | 9/1960 | Lucien | 188/72.9 |
| 3,294,200 | 12/1966 | Hodkinson | 188/72.9 X |
| 3,368,647 | 2/1968 | Laverdant | 188/73.3 |
| 3,386,534 | 6/1968 | Press | 188/71.9 |
| 3,490,562 | 1/1970 | Press | 188/196 BA X |
| 3,499,508 | 3/1970 | Swift | 188/72.9 |
| 3,612,226 | 10/1971 | Pauwels et al. | 188/73.3 |
| 3,664,469 | 5/1972 | Maurice | 188/72.9 |

*Primary Examiner*—George E. A. Halvosa
*Attorney, Agent, or Firm*—Young & Thompson

[57] ABSTRACT

The present invention relates to mechanically-operated disc-brakes of the kind comprising a disc fast for rotation with the member to be braked, a fixed support, two brake-shoes disposed respectively on each side of the disc and movably mounted perpendicularly to the plane of the disc, two operating levers adapted to co-operate with a first the brake-shoe by a cam surface, a transfer member carrying the operating levers, the member being movable with respect to the disc for the transmission to the second the brake-shoe of the force applied by the levers, and a traction cable coupled to one of the operating levers, the cable being enclosed by a sheath in abutment against the other the operating lever, the disc-brake being characterized in that the operating levers are articulated on a core member carried by the transfer member and pivotally mounted with respect to the transfer member.

The brakes according to the invention have improved braking efficiency and smaller overall size as compared with known brakes of comparable types.

31 Claims, 18 Drawing Figures

FIG.8
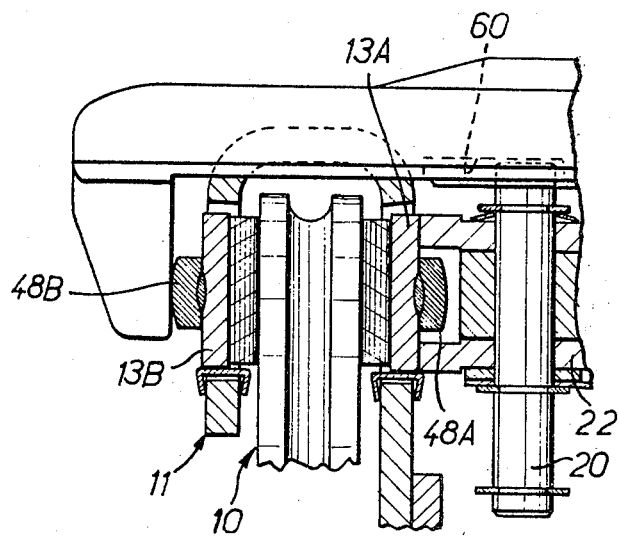
FIG.9
FIG.10
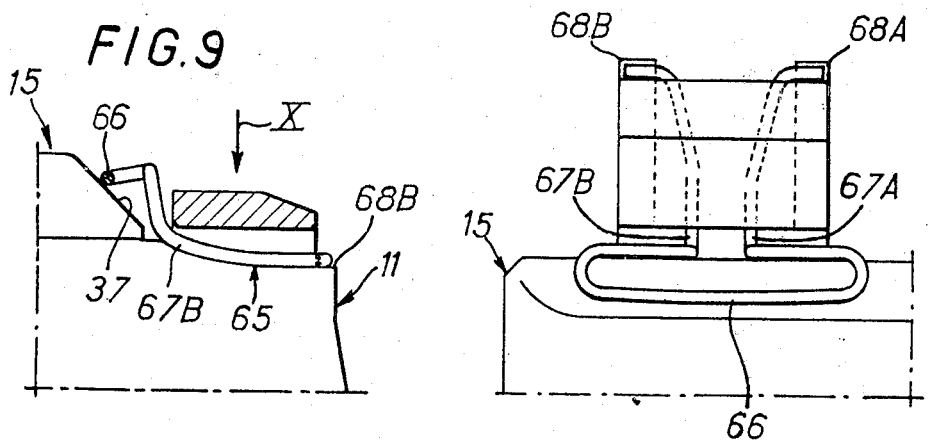

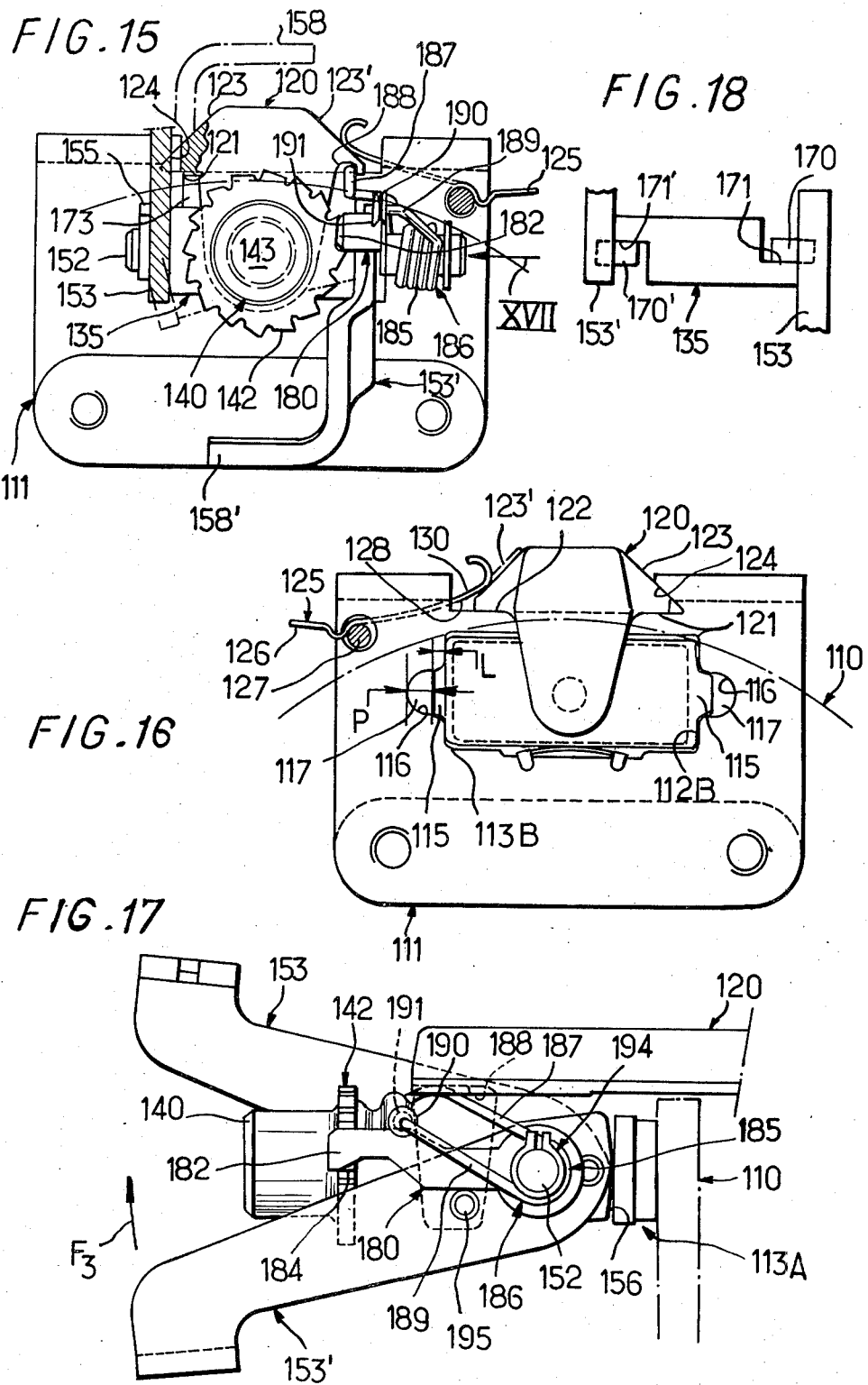

MECHANICALLY OPERATED DISC-BRAKES

The present invention relates in a general way to mechanically-operated disc brakes, and is more particularly directed to such of these brakes which comprise a disc fixed for rotation with the member to be braked, a fixed support, two brake-shoes arranged respectively on each side of the disc and movably mounted perpendicularly to the plane of the said disc, an operating lever co-operating with a first of the said brake-shoes by a cam surface, a transfer member which carries the said operating lever and which is mobile with respect to the disc for the transmission to the second shoe of the force applied by the operating lever, and a traction cable which is coupled to the said operating lever for actuating this latter.

When a tractive force is applied on this cable, the operating lever pivots on the transfer member and acts on the one hand in one direction on the brake-shoe in contact with which it is placed by its cam surface, for the application of this shoe against the disc, and on the other hand pushes back the transfer member on which it is articulated in the other direction, the said transfer member then transmitting the corresponding force to the other brake-shoe, for the application of this brake-shoe against the disc, so that the said disc is gripped by the said brake-shoes and is thus braked.

It is the usual practice to enclose the traction cable in a protective sheath.

In most cases, this sheath is in abutment at its extremity against a member fast with the fixed support, so that the reaction to which it is subjected during a tractive force applied on the cable is uselessly lost.

In order to enable this sheath reaction to participate in the gripping force of the brake and thus to improve the efficiency of this latter, it has already been proposed to separate the transfer member into two distinct transfer members on each of which is articulated an individual operating lever, the traction cable being coupled to one of these levers and the sheath in which it is enclosed being in abutment against the other of these levers.

This arrangement, which in a general way gives satisfaction, results however in a certain complication of the transfer member, thus divided into two parts, and in practice it is only acceptable when the member has the shape of a U-form stirrup engaged radially on each side of the disc and the fixed support. In fact, during braking, this transfer member or the elements which constitute it, are the subject of a certain pivotal or tilting movement which is almost incompatible with the production of this transfer member in the form of a ring, capable of surrounding a zone of the disc parallel to a chord of this latter and which furthermore result in an undesirable increase in the overall size of the brake, corresponding to the zone of movement of the said transfer member.

It has also been already proposed to associate with a single stirrup two operating levers pivotally mounted on a shaft carried in a fixed manner by the said stirrup, but the result of this assembly is that the cam surfaces by which these operating levers are in contact with a brake in friction without rolling on this shoe, which is a cause of undesirable wear.

The present invention has for its object a disc-brake of the kind referred to above having a gripping efficiency improved in a substantial manner as compared with previously known brakes of comparable type, and free from the disadvantages briefly explained above.

The disc-brake according to the invention is of the kind comprising a disc fixed for rotation to the member to be braked, a fixed support, two brake-shoes arranged respectively on each side of the disc and movably mounted perpendicularly to the plane of said disc, two operating levers co-operating with a first of the said brake-shoes by a cam surface, a transfer member which carries the said operating levers and which is movable with respect to the disc for transmission to the second shoe of the force applied by the said levers, and a traction cable which is coupled to one of the said operating levers and which is enclosed by a sheath in abutment against the other said operating lever, and is characterized in that the said operating levers are articulated on a core which is carried by the transfer member and pivotally mounted with respect to said member.

In practice, the two operating levers are articulated on the core along the same axis, parallel to the plane of the disc, or parallel to the radius of this latter passing through the central longitudinal plane of the transfer member, or parallel to a chord of this disc perpendicular to this radius, and the core is pivotally mounted about an axis perpendicular to the plane of the disc and therefore perpendicular in all cases to the pivotal axis of the said lever.

During a tractive pull applied to the cable, the operating levers pivot in opposite directions to each other, about their common axis, this opposite pivotal movement being made possible by a conjoint pivotal movement of the core or plug, like two wheels rotatably mounted on the same axle and rolling in opposite directions on a same plane.

However this may be, and due to the fact that the sheath which encloses the traction cable is in abutment against one of the operating levers, the braking efficiency is improved in considerable proportions as compared with a similar brake comprising only one single operating lever.

At the same time, the transfer member remains single and is advantageously not subjected to any pivotal or tilting movement during a braking operation.

It may have indifferently the shape of a stirrup or the shape of a ring.

Furthermore, the arrangement according to the invention advantageously facilitates the mounting on the brake of a device permitting automatic take-up of the play due to wear of the brake-shoes.

To this end, the core or plug according to the invention carries a pivotal shaft rotatably mounted in a sleeve carried by the transfer member and with this sleeve is associated a ratchet wheel, with the teeth of which cooperates a ratchet rotatably mounted on the plug around the same axis as the operating lever, the said ratchet or pawl being returned by a spring against a driving stop formed on one of the said levers.

The said sleeve is preferably fixed on the transfer member, and a hood, the bottom of which serves as an abutment for the pivotal shaft of the plug is engaged by screwing on the said sleeve, the said hood carrying the ratchet wheel associated with the said sleeve. During a braking action, the operating lever which carries the said abutment compels the pawl to pivot, and if, taking account of the wear of the brake-shoes, the pivotal movement of this pawl is sufficient for it to pass over one or more teeth of the ratchet-wheel, this pawl, urged by its return spring, will force the ratchet-wheel to rotate for releasing the brake, which causes the displacement of the core carrying the operating levers perpendicularly to the plane of the disc and therefore provides an automatic take-up of the play due to the said wear.

The characteristic features and advantages of the invention will furthermore be brought out in the description which follows below by way of example, reference being made to the accompanying diagrammatic drawings, in which:

FIG. 8 is a partial view similar to FIG. 4, and is concerned with an alternative form of construction;

FIG. 9 is a partial view in elevation similar to that of FIG. 3, with local cross-section, and relates to another alternative form of construction;

FIG. 10 is a partial view in plan of this alternative taken in the direction of the arrow X of FIG. 9;

FIGS. 15 and 16 are lateral views of this brake taken respectively in the directions of the arrows XV and XVI of FIG. 13, certain parts of this brake being assumed to be removed;

FIG. 17 is another partial lateral view of this brake in the direction of the arrow XVII of FIG. 15;

FIG. 18 is a partial view of this brake looking in the direction of the arrow XVIII of FIG. 13.

Figure 1:
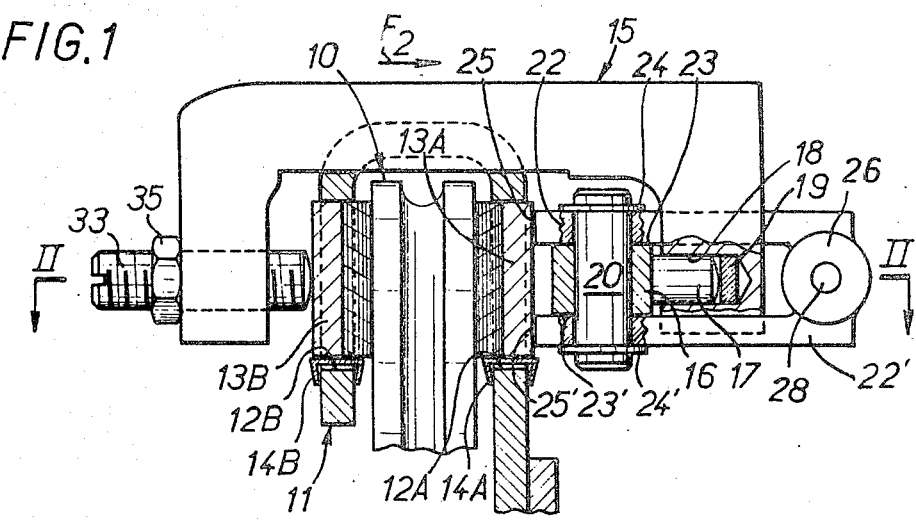
FIG. 1 is a view in axial cross-section of a first type of brake according to the invention, following a simplified form of construction of the brake.
Figure 2:
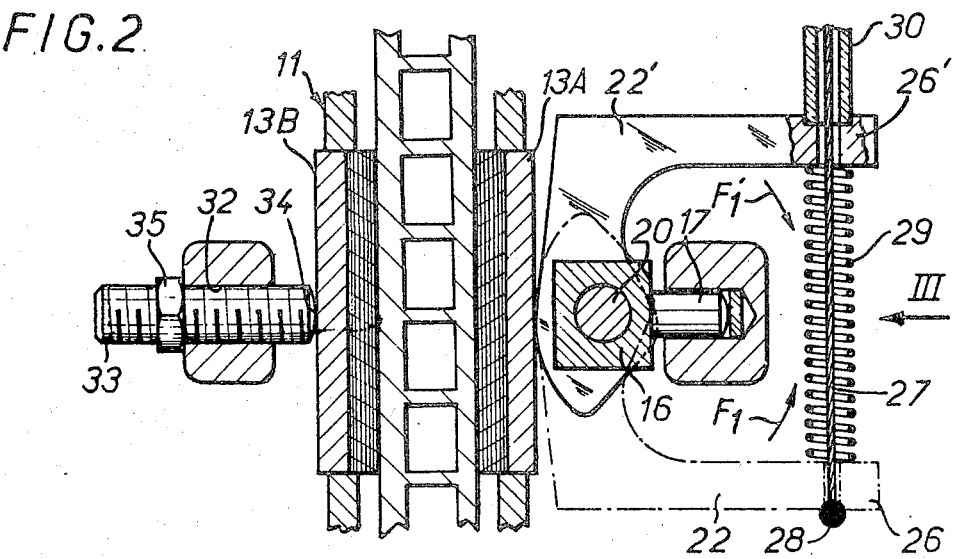
FIG. 2 is a view of this brake in longitudinal section, taken along the line II—II of FIG. 1.
Figure 3:
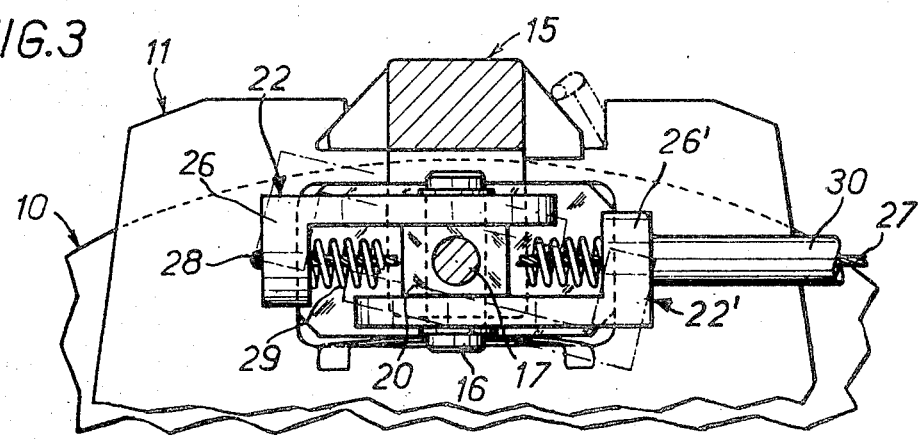
FIG. 3 is a lateral view taken in the direction of the arrow III of FIG. 2, with parts broken away and local section.

In accordance with the application illustrated especially by FIGS. 1 to 3, a brake according to the invention comprises a disc 19 intended to be keyed on a shaft to be braked (not shown). In the example shown, this disc is of the ventilated type.

The brake also comprises a fixed support 11 which, as shown in the example, is of U-shape and is engaged radially on each side the disc 10.

Facing the disc and on each side of this latter, the fixed support 11 is provided with two windows 12A, 12B, which respectively serve as housings for brake-shoes 13A and 13B.

In accordance with arrangements known in themselves, the windows 12A, 12B are adapted to retain the shoes 13A, 13B radially and circumferentially, in both directions of rotation of the disc 10, and these shoes are movably mounted in position perpendicular to the plane of the disc.

Springs 14A, 14B further urge the brake-shoes 13A, 13B into application against those circumferential edges of the windows 12A, 12B which are closest to the periphery of the disc 10.

The brake further comprises a transfer member 15, the purpose of which will be explained later and which, in the example shown, has the general form of a U-shaped stirrup engaged substantially radially on each side of the disc 10, of the fixed support 11 and of the brake-shoes 13A and 13B.

The transfer member 15 is furthermore fixed to means intended to hold it elastically in position. These means will be described subsequently with reference to more elaborate forms of embodiment of the present invention, the present simplified form of embodiment being now described only in order to facilitate the understanding of its operation.

Facing the shoe 13A, the transfer member 15 carries a core or plug 16. This latter is rigidly fixed for that purpose to a pivotal shaft 17 which is pivotally mounted in a housing 18 formed in the transfer member 15 in a direction substantially parallel to the axis of the disc 10, that is to say in a direction substantially perpendicular to the plane of the disc.

Inside the housing 18, the pivotal shaft 17 of the core 16 is in abutment against the bottom 19 of the housing.

In the example shown, the core 16 itself carries a cylindrical shaft 20 which passes right through it.

Also in the example shown, this shaft 20, which is perpendicular to the pivotal shaft 17 of the core 16, extends in a direction substantially parallel to the radius of the disc 10 passing through the central longitudinal plane of the transfer member 15, perpendicular to the plane of the disc 10.

On this cylindrical shaft 20 are rotatably and pivotally mounted on each side of the core 16, two operating levers 22, 22' which are held in application against corresponding shoulder 23, 23' of the core 16 by circlips 24, 24' engaged in grooves in the shaft 20.

Each of the levers 22, 22' has a cam surface 25, 25', by which it is in contact with the brake-shoe 13A.

A cam surface of this type has the overall shape of a section of spiral with respect to the shaft 20.

The levers 22, 22' have generally the shape of a square, and at their free extremities they carry, perpendicular to their plane, lugs 26, 26'.

A traction cable 27 is coupled to the lever 22. This cable carries for example at its extremity, an abutment 28, and from this latter it passes through the lugs 26, 26' of the levers 22, 22'.

Between the operating levers 22, 22', the cable 27 is enclosed by a restoring spring 29 which tends to separate the operating levers 22, 22' from each other.

Beyond the operating lever 22', the traction cable 27 is enclosed in a sheath 30 which is in abutment at its extremity against the lug 26' of this operating lever 22'.

Facing the brake-shoe 13B, the transfer member 15 in the example shown is provided perpendicularly to the plane of the disc 10 with a threaded passage 32 in which a threaded shaft 33 is engaged by screwing.

This threaded shaft 33 has a domed profile 34 in contact with the brake-shoe 13B, and is blocked in position on the transfer member 15 by a nut 35.

When a tractive force is applied to the cable 27, the operating levers 22, 22' pivot, one in the direction of the other, following the arrows $F_1$, $F'_1$ of FIG. 2. In fact, the gripping force corresponding, is equally divided between the levers due to the fact that the reaction due to the sheath 30 is substantially equal to the action applied to the cable 27.

In a first phase, the levers 22, 22' slide by their cam surfaces 25, 25' in contact with the brake-shoe 13A and due to the fact that the spiral profiles of these latter urge this shoe into application against the disc 10.

At the same time, the transfer member 15 which carries these operating levers 22, 22' is moved by reaction perpendicularly to the plane of the disc 10, following the arrow $F_2$ of FIG. 1, and by the threaded shaft 33, it also acts to force the brake-shoe 13B into application against the disc 10.

These shoes are thus brought into contact with the disc 10.

In a second phase, the tractive force applied to the cable 27 being continued, the operating levers 22, 22' roll without slip in contact with the shoe 13A.

For this reason, in the same way as two wheels rotatably mounted on a single axle and driven in rotation in opposite directions, the assembly formed by the operating levers 22, 22' and the core 16 which carries them, pivots with respect to the transfer member 15 about the shaft 17 which carries the core 16.

This pivotal movement is suggested in broken lines in FIG. 3, and is made possible by the flexibility of the cable 27 and the sheath 30 which encloses it.

As previously, the operating levers 22, 22' apply, but more and more powerfully, the shoe 13A against the disc 10, and conjointly the transfer member 15 transmits the corresponding force to the brake-shoe 13B which is also applied more and more powerfully against the disc 10.

The disc 10 is thus gripped by the brake-shoes 13A, 13B and is therefore braked, if so desired until it stops.

When the tractive force on the cable 27 is released, the restoring spring 29 brings back the operating levers 22, 22' to their initial positions and the disc 10 is thus released.

The more elaborate form of construction shown in FIGS. 4 to 7 illustrates in particular the retention of the transfer member 15.

For this retention, this transfer member or stirrup comprises two oblique facets 37, 37' formed respectively on those of its edges which are substantially perpendicular to the disc 10, these facets converging in a direction which moves away from the axis of this latter.

One of these facets, the facet 37 for example, is engaged against a corresponding facet 38 formed on the fixed support 11, in the same way as for a dove-tail assembly.

On the other oblique facet 37' of the transfer member or stirrup 15 is supported one of the arms 39 of a torsion spring 40 which is carried by a stud 41 provided on the fixed support 11, and the other arm 42 is keyed on the fixed support 11, the extremity of this arm being engaged to that end in a hole formed in the said fixed support.

Due to the fact that the torsion spring 40 applies its action on an inclined facet of the transfer member 15, it is clear that its force E (see FIG. 6) has a component $E_1$ which urges the transfer member 15 in a tangential direction with respect to the disc 10 for retaining this transfer member in engagement with the oblique facet 38 of the fixed support 11, and a component $E_2$ which urges the transfer member 15 along a radial direction of the disc 10 towards a shoulder 44 formed for that purpose on the fixed support 11.

Furthermore, according to the form of embodiment illustrated in FIGS. 4 to 7, the transfer member 15 bears directly through a boss 48 against the brake-shoe 13B.

Finally, according to this form of construction, the brake according to the invention is equipped with means for permitting automatic taking-up of play due to wear of the brake-shoes 13A, 13B.

For this purpose, the pivotal shaft 17 of the core 16 is shown in the example as engaged in a sleeve 50 which is forcibly driven into a bore 51 formed in the transfer member 15, and which is therefore rigidly fixed to this latter.

At a distance from the transfer member 15, the sleeve 50 has a threaded portion 50A on which a hood 50B is engaged by screwing.

The bottom 50C of this hood serves as an abutment for the pivotal shaft 17 of the core 16.

Peripherally, the hood 50B carries a ratchet wheel 52 provided with ratchet teeth 53.

Conjointly, a pawl 54 is pivotally mounted on the common shaft 20 of the operating levers 22, 22', for cooperation with the teeth 53 of the ratchet wheel 52.

This pawl is acted on by one of the arms 55 of a torsion spring 56 which is engaged on the shaft 20 and is held in position by a circlip 57, while the other arm 58 is engaged at its extremity in a hole 59 formed in the operating lever 22.

The pawl 54 is urged by the spring 55 in the direction of a driving stop 60 carried by the operating lever 22.

During the gripping of the brake, the operating lever 22 drives the pawl by its stop 60, and if the wear during the course of this braking is sufficient, the pawl 54 passes over one or more teeth 53 of the ratchet wheel 52.

In consequence, when the brake is released, the pawl 54 being brought back to its position of rest by the spring 55, causes a rotation of the ratchet wheel 52 corresponding to the number of teeth of the ratchet-wheel passed over during the previous gripping action.

The result of this rotation is an axial movement of the hood 50B, perpendicularly to the disc 10 in the direction of this latter, and therefore an equal movement of the core 16 which carries the operating levers 22 and 22', this core being keyed by its shaft 17 on the bottom 50C of the hood 50B or, in an alternative form, on an intermediate internal shoulder of the hood.

This movement of the core 16 is of such a kind as to keep the contact of the operating levers 22, 22' with the brake-shoe 13A in the position of rest. It is therefore of such kind as to compensate for the play due to wear of the brake-shoe and of the other associated brake-shoe.

Figure 4:
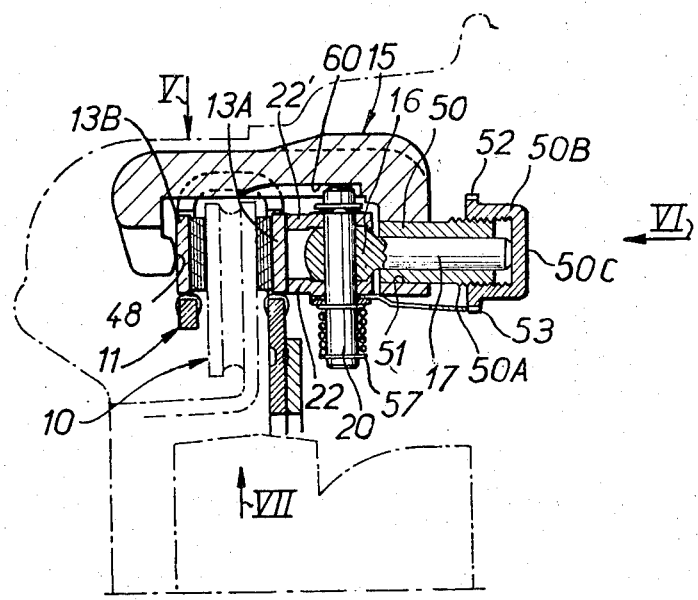
FIG. 4 is a view in axial cross-section similar to that of FIG. 1 of a more elaborate form of construction of a brake of this kind.
Figure 5:
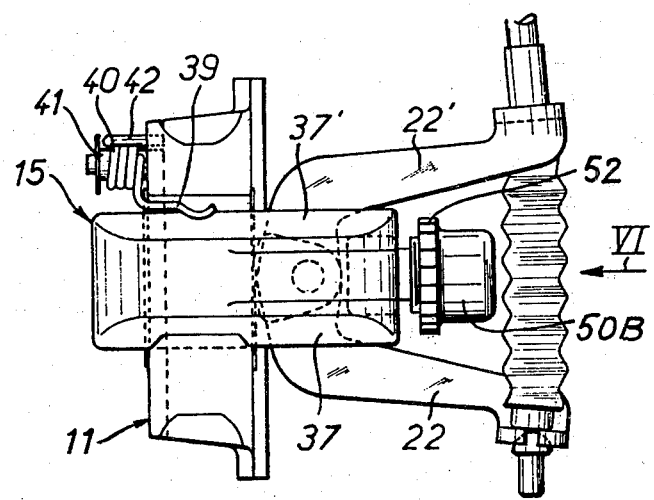
FIG. 5 is a plan view in the direction of the arrow V of FIG. 4.
Figure 6:
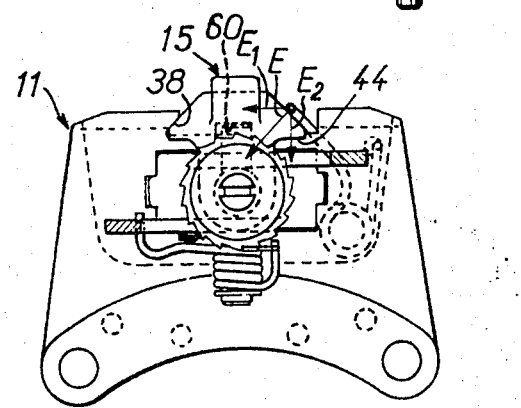
FIG. 6 is a lateral view with parts in cross-section, taken in the direction of the arrow VI of FIGS. 4 and 5.
Figure 7:
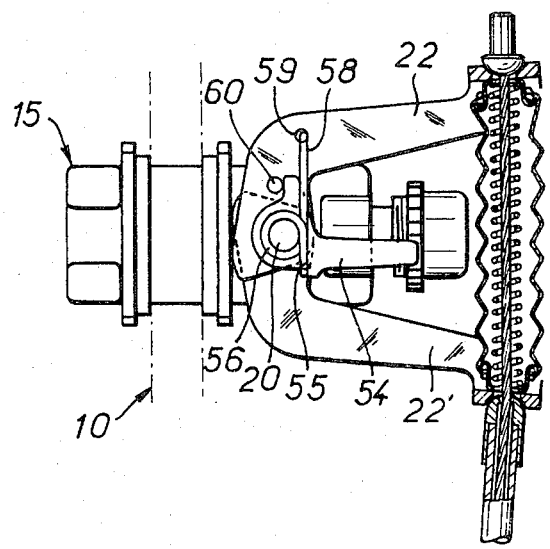
FIG. 7 is a view taken from underneath, in the direction of the arrow VII of FIG. 4.

Furthermore, and as can clearly be seen from FIGS. 4 and 6, the shaft 20 of the levers 22, 22' is engaged in a groove 60 formed at the lower face of the transfer member 15. One of the flanks of this groove 60 forms an abutment defining the position of rest of the said shaft, while the other flank is at sufficient distance to permit a rocking movement of this shaft.

According to the alternative form of embodiment shown in FIG. 8, the transfer member 15 is flat facing the brake-shoe 13B and this latter carries a domed boss 48E intended to play the part of the boss 48 carried by the transfer member 15 in the previous forms of embodiment. The shoes 13A, 13B being of similar construction so as to be interchangeable, the shoe 13A also carries a domed boss 48A.

According to the alternative form of construction shown in FIGS. 9 and 10, the holding spring of the transfer member 15 is a spring of round wire 65, suitably shaped and having generally the form of a U. This spring 65 bears at its central portion 66 on the oblique facet 37' of the transfer member 15, and has two arms 57A, 57B which are engaged in the central portion of the fixed support 11 and which have square extremities supported against shoulders 68A, 68B formed on this fixed support.

In the preceding description, the shaft 20 about which pivot the operating levers 22 and 22', extends at rest substantially in a radial direction of the disc, namely along the direction of the radius of this disc which passes substantially through the central longitudinal plane of the transfer member 15 perpendicular to the plane of the disc 10.

Figure 11:
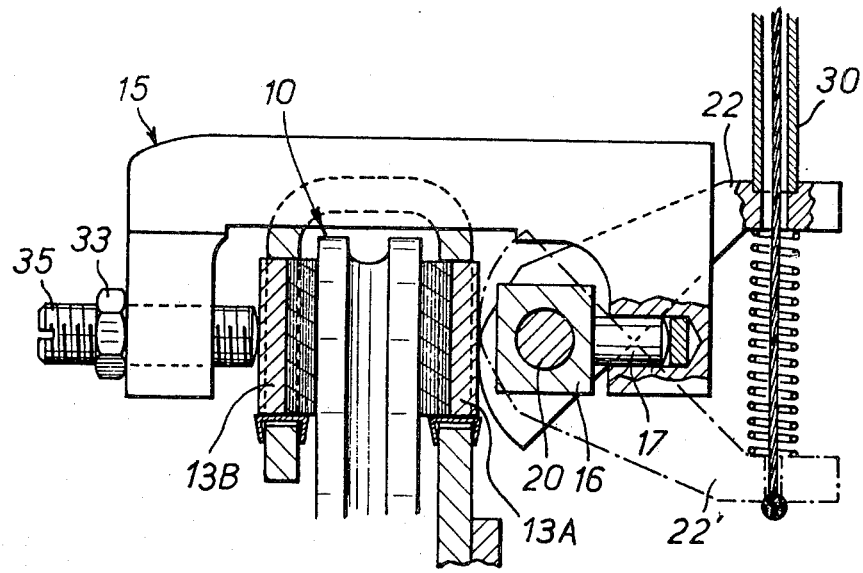
FIGS. 11 and 12 are respectively similar to FIGS. 1 and 2, and concern a second type of brake according to the invention, in accordance with a simplified form of embodiment of the said invention.
Figure 12:
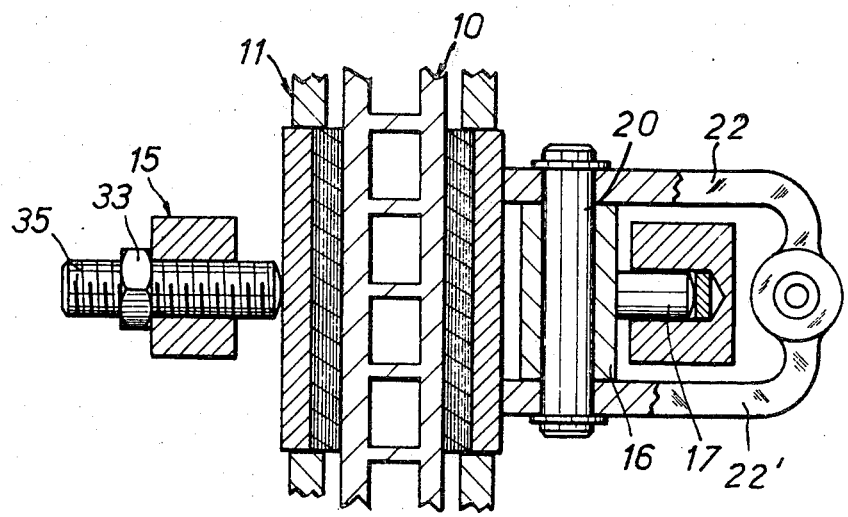

According to the forms of construction illustrated by FIGS. 11 and 12, this shaft 20 extends substantially parallel to a chord of the disc 10, close to the periphery of the disc.

This shaft 20 will of course remain perpendicular to the pivotal shaft 17 of the core 16 on which it is carried.

The operation of this second type of brake is similar in all respects to those described above.

This second type of brake may be equipped with automatic means for taking-up play due to wear of the brake-shoes, similar to those described above.

This possibility is illustrated in FIGS. 13 to 18, which correspond to a more elaborate form of construction of the brake shown diagrammatically in FIGS. 11 and 12.

As previously, a brake of this kind comprises a disc 110 intended to be keyed on a shaft to be braked (not shown), a fixed support 111 which, in the example shown, is of U-shaped and is engaged radially on each side of the disc 110, and two brake-shoes 113A, 113B, housed on each side of the disc 110 inside windows 112A, 112B formed for that purpose in the fixed support 111.

Following arrangements which are known in themselves, the windows 112A, 112B are adapted to retain the shoes 113A, 113B radially and circumferentially in both directions of rotation of the disc 110, and these shoes are movably mounted perpendicular to the plane of the said disc.

In particular, for their radial retention, the shoes 113A, 113B are each provided laterally with two lugs 115 as can be seen from FIG. 16 for the single shoe 113B, and these lugs 115 are engaged in slots 116 formed in the support 111 and opening into the window 112B serving as a housing for the shoe 113B.

Following a particular arrangement of the present invention, the depth P of the slots 116 in a direction perpendicular to the radius of the disc 110 which passes through the central zone of the shoes 113A, 113B, is considerably greater than the length L of the lugs 115 of the shoes, in the same direction.

The result is that these slots 116 form a clearance 117 beyond the lugs 115 which permit the insertion of a tool intended to facilitate the removal of the shoes when it becomes necessary to change these.

Furthermore, and as previously, springs 118A, 118B are interposed between the brake-shoes 113A, 113B and the support 111, and under the effect of these springs, the lugs 115 of these shoes are urged into application against those circumferential edges of the slots 116 in which they are engaged, which are nearest to the periphery of the disc 110.

The brake further comprises a transfer member 120 forming a U-shaped stirrup engaged substantially radially on each side of the disc 110, of the fixed support 111 and the brake-shoes 113A and 113B.

The transfer member 120 bears by its lower face 121 against a flat supporting surface 122 formed on the fixed support 111 perpendicular to the radius of the disc 110 which is in the axial plane of the support 111 perpendicular to the plane of the disc 110.

On its upper surface, the transfer member 120 is formed with two oblique facets 123, 123' provided respectively on those of its edges which are substantially perpendicular to the disc 110, these oblique facets converging in a direction which moves away from the axis of the disc.

The oblique facet 123 of the transfer member 120 is engaged against a corresponding oblique facet 124 formed on the support 111.

On the oblique facet 123' of the transfer member 120 acts a retaining spring 125 and, in the example shown, this retaining spring 125 is formed by a spring blade which is supported at one extremity 126 on a supporting pin 127 provided on the support 111 perpendicular to the plane of the disc 110 which, in its central zone, is supported at 128 on the fixed support, on the edge of the lower face of the curves zone of this support, and which acts at its other extremity 130 on the oblique facet 123' of the transfer member 120.

In the example shown, the spring blade which constitutes the retaining spring 125 has generally the shape of a T, its extremity 130 which acts on the oblique facet 123' of the transfer member 120 extending transversely with respect to its extremity 126.

In the example shown, this extremity 130 is curved back in the form of a crook. As suggested in broken lines in FIG. 16, it could also be substantially flat.

However this may be, and because of the obliquity of the facet 123 on which it acts, the retention spring 125 urges the transfer member on the one hand into application against the flat supporting face 122, by its lower face 121, and on the other hand, it acts on the oblique facet 124 of the fixed support 111 by its oblique facet 123.

Facing the shoe 113A, the transfer member 120 carries a core 135.

Figure 13:
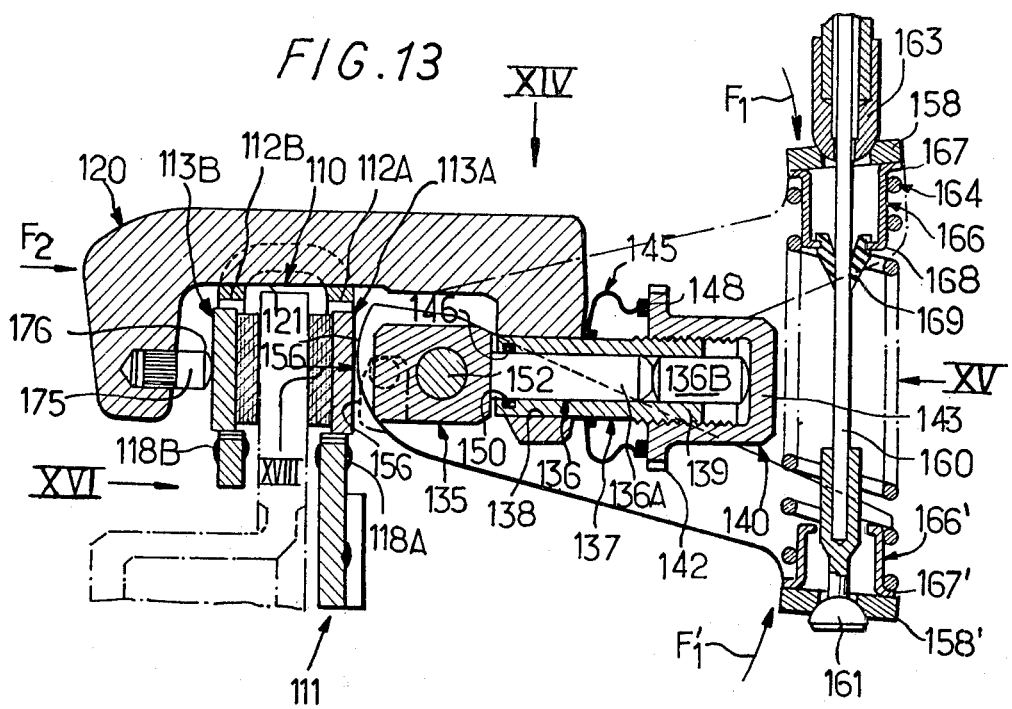
FIG. 13 is a view in axial section of a more elaborate form of construction of this second type of brake.

To this end, the latter is fixed on a pivotal shaft 136 rotatably mounted in a sleeve 137 which is frocibly driven into a bore 138 of the transfer member 120 and is thus fixed to this member (see FIG. 13).

In the example shown, the pivotal shaft 136 of the core 135 extends substantially perpendicularly to the plane of the disc 110.

The sleeve 137 is provided externally, at a distance from the transfer member 120, with a threaded portion 139 on which a hood 140 is engaged by screwing, and this hood 140 carries externally a ratchet-wheel 142.

In the example shown, the pivotal shaft 136 of the core 135 is composed of two distinct sections 135A, 136B engaged end to end in the sleeve 137 until they abut against the bottom 143 of the hood 140 screwed on the sleeve 137.

A dust cover 145 is arranged round the sleeve 137 between the transfer member 120 and the ratchet-wheel 142, and following an arrangement according to the invention, this dust cover 145 bears against the ratchet-wheel 142 by a flat surface 146. This results at this level in sufficient friction to prevent any undesired movement of rotation of the ratchet-wheel 142.

In the proximity of the core 135, the sleeve 137 has a groove 148 cut out for housing a sealing joint 150.

The machining of this groove 148 is facilitated by the fact that the sleeve 137 is a part added to the transfer member 120.

However, according to an alternative form (not shown) the sleeve 137 may be formed integrally with the transfer member and may therefore form one single piece with this member.

The core 135 carries a cylindrical shaft 152 which passes right through it.

In the example shown, this shaft 152 is perpendicular to the pivotal shaft 136 of the core 135, and extends in a direction substantially perpendicular to the radius of the disc 110 passing through the central longitudinal plane of the transfer member 120 perpendicular to the plane of the disc 110.

On this cylindrical shaft 152 are rotatably and pivotally mounted on each side of the core 135, two operating levers 153, 153' which are held in application against corresponding shoulders 154, 154' of the core 135 by rings 155, 155', preferably of the keeper-ring type to be inset.

Each of the operating levers 153, 153' has a cam surface 156, 156' by which it is in contact with the brake-shoe 113A. Such a cam surface has the overall form of a spiral section with respect to the shaft 152.

At their free extremities, the levers 153, 153' carry lugs 158, 158' perpendicularly to their plane.

A traction cable 160 is coupled to the lever 153'.

For example, this cable carries for that purpose at its extremity an abutment 161 and starting from this it passes successively through the lugs 158' and 158 of the levers 153' and 153.

Beyond the operating lever 153, the cable 160 is enclosed in a sheath 163 which at its extremity is in abutment against the lug 158 of this operating lever 153.

Between the operating levers 153 and 153', the cable 160 is enclosed by a return spring 164 which tends to cause the operating levers 153 and 153' to move away from each other.

In the proximity of each operating lever 153, 153' and between these levers, is arranged a ring 166, 166' which is supported against the lug 158, 158' of the corresponding lever 153 and 153' by a radial flange 167, 167' at its extremity, projecting externally.

By a radial extremity flange 168 which projects internally, the ring 166 associated with the operating lever 163 carries an elastic scraper joint 169 which surrounds the cable 160 and is applied annularly against this cable.

Following an arrangement according to the present invention, the spring 164 is mounted round rings 166, 166', associated with the operating lever 153, 153', so that this spring has turns of large diameter capable of giving it good resistance to buckling.

Figure 14:
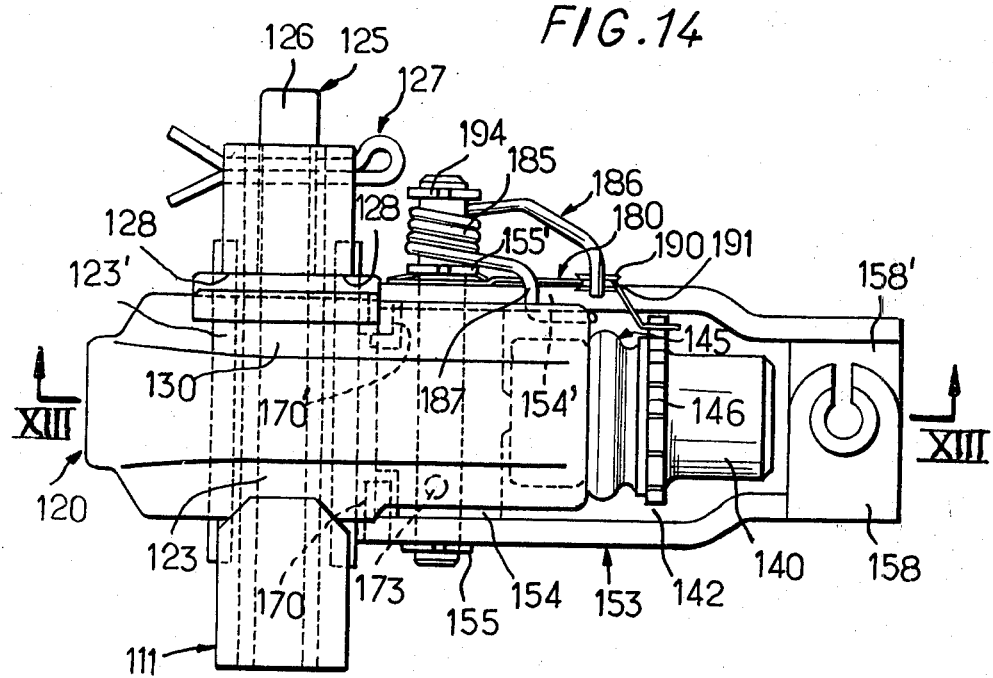
FIG. 14 is a plan view of this brake in the direction of the arrow XIV of FIG. 13.

In proximity to the brake-shoe 113A, the operating levers 153, 153' each carry a stop-finger 170, 170' intended to co-operate with shoulders 171, 171' of the core 135 in order to define a position of rest for these operating levers (see FIGS. 14 and 18).

The core 135 conjointly carries a stop-finger 173 intended to co-operate with the lower face 121 of the transfer member 120 in order to define a position of rest for the core 135 (see FIGS. 14 and 15).

Facing the brake-shoe 113B, the transfer member 120 carries a finger 175 with a rounded extremity 176.

On the common shaft 152 of the operating levers 153 and 153' is also engaged by pivotal movement a pawl 180 which is held against the operating lever 153' by the keeper ring or circlip 155' associated with the latter, and the free extremity 182 of which co-operates with the teeth of the ratchet-wheel 142.

As can be seen from FIG. 17, the extremity 182 of the pawl 180 which co-operates with the teeth of the ratchet-wheel 142 has that of its edges 184 which co-operates effectively with the said teeth and which extends obliquely facing the shaft of the ratchet-wheel, in a plane parallel to the said shaft.

Thus, in the position of rest and as shown in FIG. 17, this wording edge 184 only bears on one of the teeth of the ratchet-wheel by the transverse extremity of this tooth.

On the other hand, during operation, that is to say when a force is effectively applied by the pawl 180 on the tooth of the ratchet-wheel 142 with which it is in engagement, as explained below, it comes to bear on this tooth over the whole length of this tooth, due to the obliquity of its leading edge 184.

On the shaft 152 is also engaged the central torsion portion 185 of a torsion spring 186.

One of the arms 187 of this torsion spring is supported against the transfer member 120, and its corresponding extremity is engaged for that purpose in a groove 188 of the said transfer member, which prevents it from escaping from this latter.

The other arm 189 of the torsion spring 186 is supported against the pawl 180, and in the example shown this arm 189 carries for that purpose a roller 190 having a groove 191 by which it is engaged on the edge of the pawl 180.

This arrangement permits, without undesirable hammering of the pawl 180, both a transverse displacement of the torsion arm 189 of the spring 186 with respect to the pawl 180, perpendicular to this latter, and a longitudinal displacement of this arm along the said pawl.

The torsion spring 186 is held on the shaft 152 by a keeper-ring 194 inset on the shaft, and it urges the pawl 180 into application against a finger stop 195 carried by the operating lever 153' (see FIG. 17).

When a tractive force is applied on the cable 160, the operating levers 153, 153' pivot in the same direction following the arrows $F_1$ and $F'_1$ of FIG. 10, and the disc 110 is gripped following a process similar to that described above.

When this tractive force is stopped, the disc 110 is again released.

Furthermore, during the application of the brake, the operating lever 153 drives by means of the finger 195 which it carries, the pawl 180 in the direction of the arrow $F_3$ of FIG. 17, and, if the wear during the course of this braking is sufficient, the pawl 180 passes over one or a number of the teeth of the ratchet-wheel 142.

In consequence, when the brake is released, the pawl 180 being brought back to its position of rest by the spring 186, in which position it is in abutment against the finger 195 of the operating lever 153, it causes rotation of the ratchet-wheel 142 corresponding to the number of teeth of this wheel passed over during the previous action of braking.

The result of this rotation of the ratchet-wheel 142 is an axial movement of the pivotal shaft 136 of the core 135 perpendicular to the disc 110 and in the direction of this disc, this pivotal shaft 136 being in abutment against the bottom 143 of the hood 140 which carries the ratchet-wheel 142, and therefore a movement of equal extent of the core 135.

This movement of the core 135 is such as to hold in the position of rest the contact of the operating levers 153, 153' with the brake-shoe 113A. It is therefore such as to compensate automatically for the play due to wear of this brake-shoe and of the associated brake-shoe 113B.

In the embodiments comprising a device for taking-up play, it will have been noted that the sleeve in which the pivotal shaft of the core is rotatably mounted and which thus ensures the centering of this pivotal shaft, is advantageously fixed for rotation with respect to the transfer member.

This centering action is thus ensured in a reliable and effective manner.

At the same time, the associated ratchet-wheel is not carried by this sleeve, but is on the contrary engaged by screwing on the sleeve at a distance from the portion of this sleeve which ensures the centering of the pivotal shaft of the core, and the possible tilting forces to which the core is subjected are in consequence without effect on this ratchet-wheel; there is no risk of locking of this wheel.

It will of course be understood that the present invention is not restricted to the forms of embodiment descrobed and shown, but includes any alternative form of construction and/or of combination of their various parts.

In particular, instead of having the form of a U-shaped stirrup engaged substantially radially on each side of the disc and the fixed support, the transfer member could have a general annular shape and it may surround the fixed support, the disc and the brake-shoes, substantially parallel to a chord of the said disc.

Similarly, the fixed support could be a member having the shape of a bracket instead of being a U-shaped member.

These arrangements are well known in themselves as regards this transfer member and this fixed support, and it is therefore not necessary to explain them here in greater detail.

What I claim is:

1. A parking type disc brake comprising a disc mounted for rotation with a member to be braked, a fixed support, a brakeshoe mounted relative to the fixed support on each side of said disc for movement perpendicular to the plane of said disc, a pair of operating levers having cam means in rolling contact with a first one of said brakeshoes for applying braking force thereon, a traction cable coupled to one of said operating levers, a sheath surrounding the cable and in abutment against the other of said operating levers, a transfer member mounted for movement with respect to said disc for transmitting braking force to the second brakeshoe, a core member pivotally mounting said pair of operating levers about a first axis, and means pivotally mounting said core member on said transfer member about a second axis which is transverse to said disc and to said first axis and to said cable, said operating levers being pivoted at points spaced along said first axis on opposite sides of said second axis, whereby in response to pivotal movement of said operating levers about said first axis, said core member pivots about said second axis thereby enabling rolling contact of said cam means on said first brakeshoe while applying the braking force thereto.

2. A disc brake according to claim 1, said first and second axes being perpendicular to each other.

3. A disc brake as claimed in claim 2, wherein the second axis is parallel to the axis of said disc.

4. A disc brake according to claim 1, wherein the cam means includes one cam surface on each of said operating levers, said cam surfaces viewed in the plane of said transfer member being located directly opposite the portion of said second brakeshoe in engagement with the transfer member.

5. A disc brake as claimed in claim 1, wherein said first axis is, in the rest position, substantially parallel to the radial direction of said disc viewed in the central longitudinal plane of said transfer member and perpendicular to the axis of said disc.

6. A disc brake as claimed in claim 1, wherein said second axis is, in the rest position, substantially perpendicular to the radial direction of said disc viewed in the central longitudinal plane of said transfer member and perpendicular to the plane of said disc.

7. A disc brake as claimed in claim 6, and a finger on said core member and abutting against said transfer member in order to define the rest position of said core member.

8. A disc brake as claimed in claim 6, wherein each of said operating levers carries a finger that comes into abutment against the associated core member in order to define the rest position of said lever.

9. A disc brake as claimed in claim 6, wherein said means for pivotally mounting said core member comprises a pin mounted on said core member and disposed in a sleeve carried by said transfer member and further comprising a ratchet wheel associated with said sleeve, said ratchet wheel having teeth engaging with a pawl, said pawl being mounted rotatably on said core member, and resilient means urging said pawl against a driving abutment formed on one of said operating levers.

10. A disc brake as claimed in claim 9, further comprising a hood, the closed end of said hood abutting said pin on said core, said hood being screwed on said sleeve remote from said transfer member and being integral with said ratchet wheel.

11. A disc brake as claimed in claim 10, wherein said pin is divided into at least two separate sections mounted end-to-end inside said sleeve, said divided pin abutting against the closed end of said hood screwed on said sleeve.

12. A disc brake as claimed in claim 9, wherein said sleeve is integral with said transfer member.

13. A disc brake as claimed in claim 9, wherein said sleeve is fixed on said transfer member and is locked against rotation on said member.

14. A disc brake as claimed in claim 9, wherein said resilient means comprises a torsion spring having one arm engaging said pawl, another arm being supported on said transfer member.

15. A disc brake as claimed in claim 14, wherein the extremity of said other arm of said torsion spring is disposed in a groove in said transfer member.

16. A disc brake as claimed in claim 14, wherein said one arm of said torsion spring carries a roller device having an annular groove engaging said pawl.

17. A disc brake as claimed in claim 14, wherein said torsion spring has a torsion zone which is received on a pin carried by said core member for pivotally mounting operating levers.

18. A disc brake as claimed in claim 9, wherein the extremity of said pawl cooperating with the teeth of said ratchet wheel is oblique in the rest position of said ratchet wheel, in a plane parallel to said pin.

19. A disc brake as claimed in claim 9, further comprising an elastic ring around the sleeve in which the pivotal pin of said core member is rotatably mounted, between said transfer member and said ratchet wheel engaged by screwing on to said sleeve, said ring having a flat surface bearing against said ratchet wheel.

20. A disc brake as claimed in claim 1, wherein the pivotal mounting of said operating levers comprises a cylindrical pin carried by said core member.

21. A disc brake as claimed in claim 20, wherein one of the ends of said cylindrical pin is disposed in a groove in said transfer member, one of the flanks of said groove comprising an abutment defining a rest position of said pin.

22. A disc brake as claimed in claim 1, wherein said transfer member is generally ring shaped extending around said fixed support, said disc and said brakeshoes, parallel to a chord of said disc.

23. A disc brake as claimed in claim 1, wherein said transfer member comprises a U-shaped stirrup substantially radially disposed on each side of said disc and of said fixed support.

24. A disc brake as claimed in claim 23, wherein said stirrup is provided with two oblique flats on its edges substantially perpendicular to said disc converging from the axis of said disc, a first one of said flats bearing against a third flat on said fixed support, the second flat supporting a retention spring carried by said fixed support.

25. A disc brake as claimed in claim 24, wherein said retention spring is a torsion spring, one of the arms of said spring being keyed to said fixed support and the other arm of said spring bearing on one said oblique flat associated with said transfer member.

26. A disc brake as claimed in claim 24, wherein said retention spring is a U-shaped spring of round wire, the central portion of said spring being supported on said one of said oblique flats, the two arms of said spring being in abutment against said fixed support.

27. A disc brake as claimed in claim 24, wherein said retention spring comprises a leaf spring, one end of said leaf spring being supported on a holding pin on said fixed support, the central zone of said holding pin being directly carried by said fixed support and acting at its other end on said one of said oblique flats.

28. A disc brake as claimed in claim 1, further comprising a cylindircal ring member disposed around the traction cable between said operating levers and close to at least one of said levers, said cylindrical ring member being supported at one end against said operating lever and at the other end carrying a scraper joint in engagement with said traction cable, and a restoring spring mounted between said operating levers, around said ring member.

29. A disc brake as claimed in claim 1, wherein at least one of said brakeshoes is disposed in an opening in said fixed support and has two laterally extending lugs disposed in slots communicating with said opening, said slots having a width substantially greater than the corresponding length of said lugs.

30. A disc brake as claimed in claim 29, wherein said support is bracket-shaped.

31. A disc brake as claimed in claim 1, wherein said fixed support comprises a U-shaped member extending substantially radially on each side of said disc, said fixed support having two openings receiving said brakeshoes.

* * * * *